UNITED STATES PATENT OFFICE.

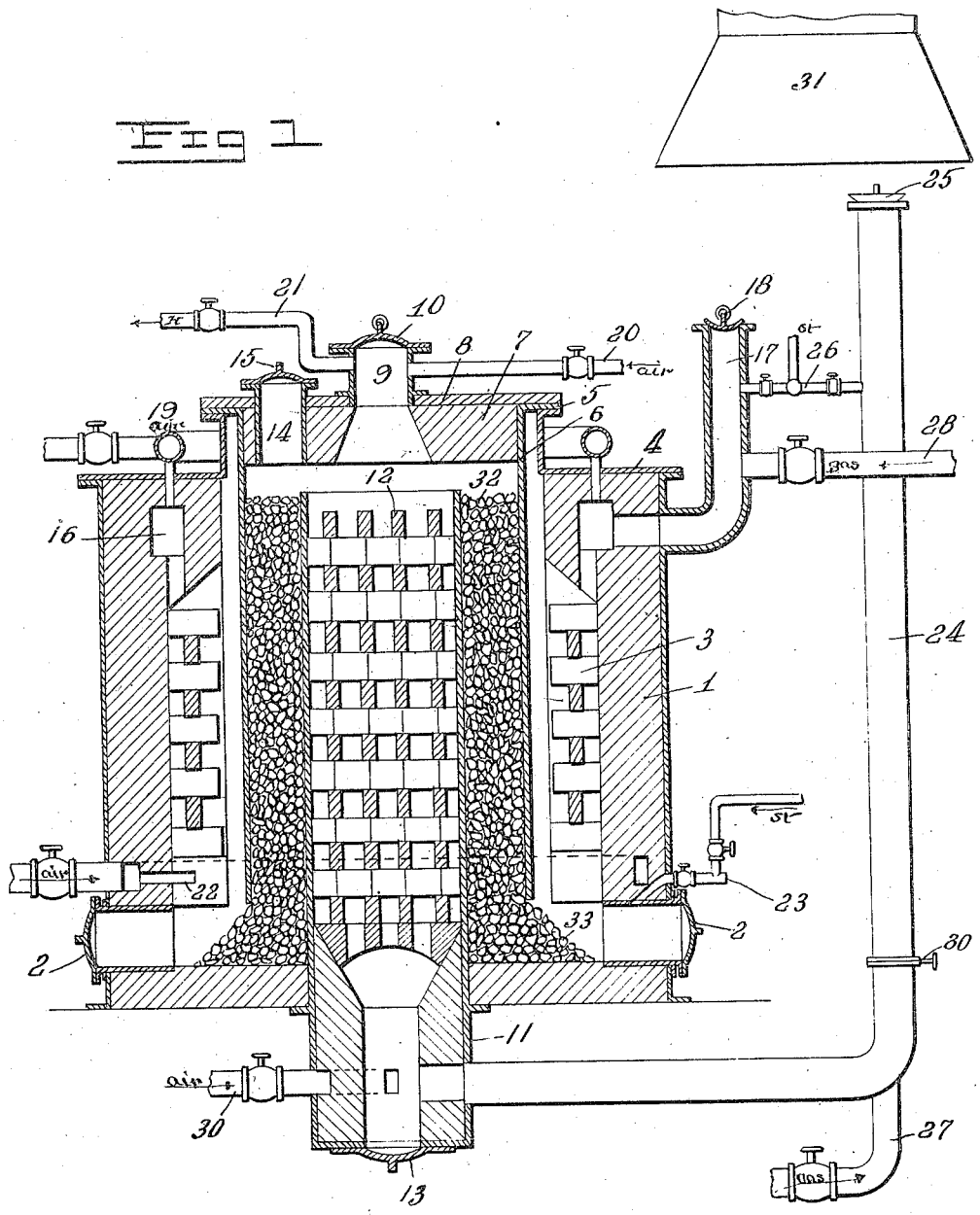

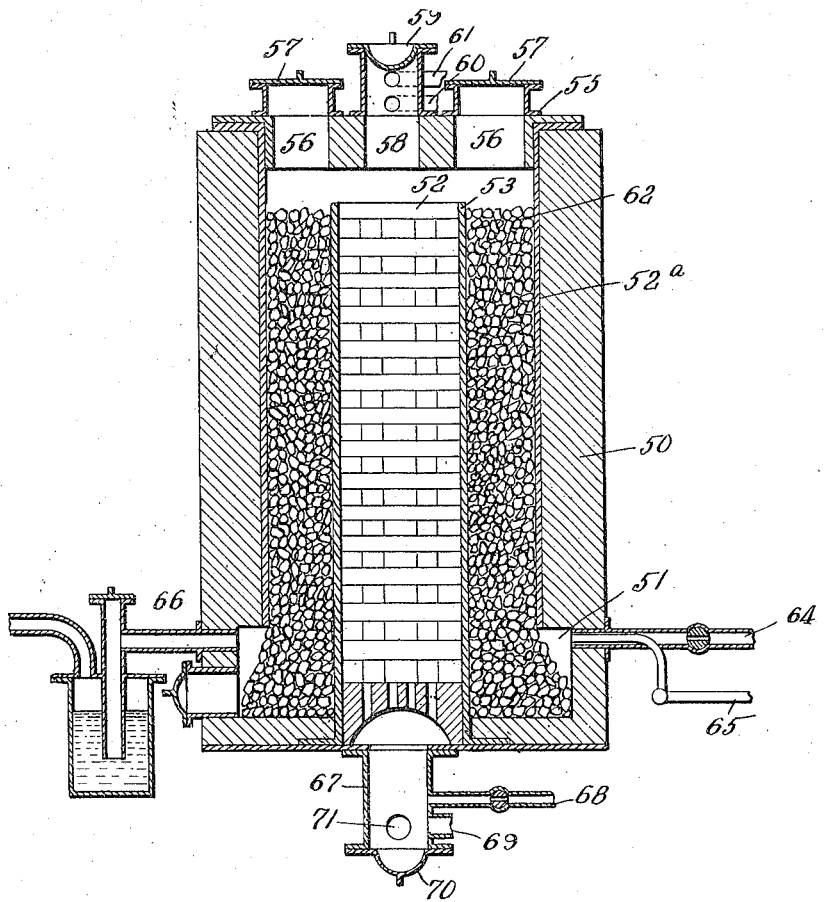

ANTON MESSERSCHMITT, OF STOLBERG, GERMANY.

PROCESS OF MAKING HYDROGEN.

1,152,196.     Specification of Letters Patent.     Patented Aug. 31, 1915.

Application filed June 10, 1913. Serial No. 772,785.

*To all whom it may concern:*

Be it known that I, ANTON MESSERSCHMITT, a citizen of the German Empire, residing at Stolberg, in Rhineland, Germany, have invented certain new and useful Improvements in Processes of Making Hydrogen, of which the following is a specification.

This invention relates to processes of making hydrogen; and it comprises a method of producing hydrogen by alternate action of draft currents of steam and of reducing gas on a heated porous contact mass of iron or the like wherein such mass is not only directly heated but heat is also developed within said contact mass during all or part of the reduction phase by admixture of a small amount of air with the draft current of reducing gases thereby causing a limited combustion of the same with the development of heat in contact with said contact mass and the gas is thereafter completely burnt externally to furnish more heat for such direct heating; all as more fully hereinafter set forth and as claimed.

In the manufacture of hydrogen for technical purposes on the large scale where a pure gas is required, it is usual to employ some form of the iron method using a contact mass comprising reduced iron. Ordinarily, iron or iron ore is employed and it is arranged in some form of container to expose as much surface as possible to the various draft currents, the capacity or output of a given apparatus of course being dependent upon the area of surface so exposed. The contact mass is alternately reduced by currents of reducing gas; such as water gas, and reoxidized by a draft current of steam with production of hydrogen. Heat is supplied to the charge in various ways to keep it at the reacting temperature.

In the present invention I have devised a simple and ready way of supplementing the heating by carrying additional heat units into the interior of the mass. After the oxidizing, or hydrogen producing phase, in the reduction phase which follows I use a limited amount of air with the reducing gas; an amount of air which though capable of producing a substantial amount of heat by oxidation of reducing gases nevertheless does not destroy the reducing power for iron oxid of the draft current as a whole. Such a mixture as this is too dilute as regards the air to burn with explosion or flame. For example, after the reaction mass has been treated with a draft current of steam and the superficial or exposed metal is wholly or partially converted thereby into oxid of iron, I pass through it a current of "blue" water gas, or the like, mixed with, say, 10 per cent. of air. A mixture like this will not burn freely under ordinary circumstances but in a hot chamber or when passed into contact with the catalytically acting iron and iron oxid it undergoes combustion with development of heat, this development of heat being mainly in contact with the catalyst and not local; is not producing a local flaming combustion. At the same time so small a proportion of air as this does not destroy the reducing power of a draft current of water gas for iron oxid. I may therefore produce simultaneously a combustion of part of the water gas with development of heat and a reduction of iron oxid by a further part of the water gas. As the reduction of iron oxid by water gas and like gases does not go to complete oxidation of the gas current the effluent gas passing the contact mass is still combustible and I therefore burn it around the retort containing the reaction mass. In other words the draft current of reducing gas in this operation has three distinct functions: a portion of it is burning to produce internal heat, another portion is reducing the iron oxid and the residue is conducted away and burnt to produce heat around the reaction mass. The admixture of air with the reducing gas may be any small proportion that is desired, care however being taken that not enough is used to destroy the reducing power of the draft current for iron oxid. If desired, the air may be introduced with the first portions of the reducing draft current and after sufficient local heating is accomplished, the supply of air may be shut off while the flow of reducing gas is continued. After the iron is reduced, it may be steamed in the usual way to produce hydrogen.

While the described method is applicable to any type of heated apparatus wherein hydrogen is produced by alternate reduction and steaming of iron, etc., yet it may be most advantageously used in connection with apparatus of the type described and claimed in my copending application 706,118, filed June 26, 1912, wherein the various draft currents go successively both through the reaction mass and through the heating chamber.

In the accompanying illustration I have shown more or less diagrammatically certain organizations of apparatus elements useful in the performance of the described process.

In this showing, Figure 1 is a central vertical section of one form of apparatus similar to that shown in said application 706,118, and Fig. 2 is a similar section of another form of apparatus.

In the showing of Fig. 1, element 1 is a furnace chamber of masonry or the like provided at its lower end with doors 2 for removing reaction material when such removal becomes necessary. Within, this chamber is provided with a checkerwork 3 of any of the refractory materials, such as fire brick. This checkerwork chamber has two functions: that of serving as a combustion and heat storing chamber for furnishing heat to the retort (6) and that of serving as a preheating chamber for gas and steam. At its top it is provided with steel plate 4 upon which rests flange 5 of depending cylindrical casing or retort 6 which may be of iron or steel. As shown this depending retort reaches to a point somewhat short of the bottom of the furnace chamber thereby establishing gas communication between the chambers within and without the retort. Above, it is closed by top 7 of refractory material carried on plate 8. Through this top is conduit 9 closed by door 10. Projecting upwardly from the bottom of the apparatus is another cylindrical casing 11 reaching to a point somewhat short of the top and thereby establishing communication between the chambers within and without the retort. Within this casing which forms a second combustion chamber, is a checker 12 of fire brick or other refractory material. This checker chamber also has the double function. At the bottom, this combustion chamber is closed by door 13. The two cylindrical casings are spaced apart a suitable distance to form an annular chamber for the reaction mass, this chamber by the described arrangement of the casings also forming a conduit through which communication between the chamber outside the one casing and the chamber inside the other casing, may be established. Channel 14, closed by door 15, allows introduction of reaction material into the annular chamber. Near the top of the masonry of the outer chamber is an annular channel 16 into which enters conduit 17 closed at the top by door 18. Annular bustle pipe 19 is tapped into the annular channel at intervals and serves for the introduction of air. Pipe 20 serves for the introduction of air into the inner furnace chamber through conduit 9. Pipe 21 serves to lead away hydrogen. Tapped through the furnace wall near the base are a number of twyers 22 for the introduction of air; these leading in tangentially if desired. Pipe 23 serves for the introduction of steam. Conduit 24 closed at the top by door 25 is provided with valved connections 26 for steam and 27 for gas. Steam pipe 26 is also connected to conduit 17. Valved inlet 28 allows the introduction of gas into 17. The conduit 24 leads at one end to the inner furnace chamber. Valved inlet 30 allows tangential introduction of air. Hood 31 is for disposal of waste gases. Between the two iron cylinders in the annular chamber for reaction material is an annular mass of contact material 32 which may be spongy iron, reduced iron ore, etc. I find lumps of manganese-iron ore, or briquets of a mixture of iron oxid and manganese oxid, a very good contact material for the present purposes since the mass retains its porosity, manganous oxid serving to space apart the particles of metallic iron formed in reduction. It is of further advantage in that it has some catalytic activity and tends to prevent the deposition of carbon in the mass and thereby the formation of iron carbids which in the steaming phase would give rise to the production of evil smelling hydrocarbons. At its base, the annular column of contact material forms an angle-repose pile 33. As will be seen, communication between the inner and outer furnace chambers is afforded through this column of reaction material. The two iron cylinders which form the reaction chamber and inclose the annular column being in a vertical position do not warp out of shape upon heating. As in the operation hereinafter described, they are exposed to reducing gases in each pass, they do not tend to oxidize and corrode as do retorts continuously exposed to flame while, from the structure, substantially the same gas pressure prevails within and without.

The structure of Fig. 2 (which is similar to that disclosed in my copending application Serial No. 772,784, filed June 10, 1913) is an alternative form and comprises a masonry casing 50 chambered at its base to form an annular passage 51. Within this casing and forming its inner wall may be an iron or steel casing 52$^a$. As shown, it does not extend into passage 51. This casing may be dispensed with but its employment is useful. Spaced some distance within the casing is another iron or steel casing 53 stopping somewhat short of the top but extending to the bottom. Within this casing and formed by it is a combustion chamber containing checkerwork 52 of fire brick or other refractory material. This chamber serves both as a heat developing and heat storing chamber having the double function of the similar chambers of Fig. 1. The apparatus at the top is closed by top 55 having ports 56 closed by doors 57 for the introduction of reaction material. Centrally, it is provided with a conduit 58 closed by door 59 and provided with air inlet 60 and gas inlet 61. Within the reaction chamber afforded by the space between the inner cylinder and the furnace wall is a pervious body or column of ferruginous contact material 62. Entering the annular channel (51) are gas inlet 64 and air inlet 65. Conduit 66 allows withdrawal of hydrogen. At its base, the inner furnace chamber is provided with a prolongation 67 provided with steam inlet 68, and air inlet 69, a removable door 70 and an outlet 71 for waste gases.

In the use of the structure of Fig. 1, presuming the steaming phase and the production of hydrogen ended, gas may be led in through 28 and admixed with a minor proportion of air from 19, say, in the case of "blue" water gas, with 10 to 20 per cent. of air. Such a mixture as this is not freely combustible under ordinary conditions but will burn with development of heat in contact with the hot checkerwork or with the reaction mass 32. The admixture passing downward through the checker enters the reaction column 32 at its base through 33 and flows upward reducing the contact material as it passes. The modicum of air admixed with the reducing gas produces a limited amount of combustion with development of heat in the material itself. The slight amount of combustion here contemplated may take place without materially interfering with reduction by the unburning portion of the gases. Passing upward, the reducing gas which is still freely combustible after reducing the oxids of iron, flows downward through checker or combustion chamber 12 and is there burnt with air admitted from 20, heating the checker and, by conduction through 11, also heating the contact mass. The products of combustion pass away through 24, cap 25 being removed. In the later stages of reduction, the inflow of air from 19 may cease and the reduction be completed with pure combustible gas. When operating in this manner, i. e. finishing the reduction with non-burning gas, the amount of air in the first stage of reduction may be increased considerably. When the reduction phase is ended and the iron is deoxidized, the introduction of gas from 28 is stopped and steam is blown into the outer chamber from 23. This displaces gas upwardly through 17, 18 being left open for its escape. Cap 18 is now replaced and the steam introduction through 23 cut off. This leaves chamber 3 full of steam at a high temperature due to its contact with the hot checker.

Steam is now blown in from 26 and passes downward through the checker chamber, displacing before it the superheated steam. This hot steam passes through 33 and upward through the contact mass forcing residual reducing gas ahead of it and outward through 21. In its passage the steam is converted into hydrogen and when pure hydrogen appears in 21 it may be sent to any suitable place of storage or use (not shown). In this steaming operation, checker chamber 12 is not in the line of flow, but, prior to the steaming operation, the waste gases therein should be blown out or displaced by sending steam from 26 through conduit 24 and thence upward through the inner checker chamber, cap 10 being removed during this blowing out. After the steaming phase is complete, that is when the production of hydrogen begins to fall off, the reduction of the iron may be once more begun.

If desired, heating phases may be intercalated. For this purpose, gas may be blown into the inner chamber from 27 (valve 80 being closed), and there burnt by the full amount of air from 30, the products of combustion escaping past 10. Or, instead of allowing the hot products of combustion to escape at 10 they may be made to traverse the reaction material downward and the outer checker upward to escape at 18. At the end of the steaming phase the iron is oxidized and contact with the hot products of combustion does no injury.

From time to time the direction of circulation in the reducing phase is reversed. This is done by introducing gas from 27 with a little air from 30, passing the mixture upward through the checker 12 to become superheated therein, thence downward through 32, and upward through the outer checker chamber 3. In this outer checker chamber 3 the combustion may be completed by the introduction of air from 22 and products of combustion vented at 18.

The operation of the structure of Fig. 2 is of like character. Presuming reaction mass 62 to be oxidized by a steaming phase, it may be again reduced by running gas from 64 upward therethrough, a modicum of air from 65 being admixed therewith. Reduction takes place as before. The gas emerging from the top of 62 which is still freely combustible may be burnt in the inner checker chamber or combustion chamber 52 by air from 60. The products of combustion pass to waste through 71. In this operation, as before, the reduction may be begun with gas containing a little air and finished with pure gas. In the steaming phase, steam may be introduced through 68 and passed upward, door 59 being removed, until all the products of combustion are displaced and steam appears. At this time the checker chamber is full of superheated steam. Door 59 is then replaced and the superheated steam in the checkerwork is then caused to pass downwardly through 62 by the introduction of more steam from 68. As the steam passes downwardly through 62 it is converted into hydrogen and downwardly displaces the combustible gas still remaining therein. This combustible gas and finally hydrogen escape through 66. As soon as pure hydrogen appears, it is sent to a place of use (not shown). From time to time a heating phase may be intercalated by introducing air and gas in the correct proportions through 60 and 61 and burning in the inner checker chamber, the products of combustion being vented at 71.

The usual types of recuperators and regenerators may be used in connection with the apparatus shown for preliminarily heating the various draft currents by heat recovered from outgoing gases.

The described operation of admixing a modicum of air with the reducing gases, or with the first portion of the reducing draft current, may of course be used with other types of apparatus than those shown, as, for instance, in using the ordinary types of closed retorts contained in and heated by a combustion chamber.

While other reducing gases than water gas may be used, I regard ordinary, or "blue," water gas as best adapted for my purpose.

What I claim is:

1. In the manufacture of hydrogen by the alternate passage of draft currents of reducing gas and of steam through a hot pervious ferruginous reaction mass, the process which comprises heating said mass during the reduction phase by external heat and also by development of heat internal to the mass by a limited combustion of said reducing gas therein.

2. In the manufacture of hydrogen by alternate passage of draft currents of reducing gas and of steam through a pervious ferruginous reaction mass contained in a hot chamber in heat-transferring relationship thereto, the process which comprises admixing a little air with the reducing gas used in the reducing phase and passing the mixture through said hot chamber and thence through said reaction mass.

3. In the manufacture of hydrogen by alternate passage of draft currents of reducing gas and of steam through a pervious ferruginous reaction mass contained in a hot chamber in heat-transferring relationship thereto, the process which comprises following the steaming stage by passing a draft current of combustible gas into said hot chamber and thence into and through said pervious mass and supplying air to said draft current prior to entering the hot chamber during the initial portion of the passage of the same, such air supply being discontinued during the later portion of the passage.

4. In the manufacture of hydrogen by alternate passage of draft currents of reducing gas and of steam through a hot pervious reaction mass, the process which comprises following the steaming stage by passing a draft current of combustible gas admixed with a modicum of air first through a hot chamber in heat-communicating relationship to such mass, next through such mass and finally adding more air and completing the combustion of the gas in another hot chamber in heat-communicating relationship to such mass.

5. In the manufacture of hydrogen by alternate reduction and steaming, the process which comprises maintaining a pervious hot ferruginous reaction mass in heat-absorbing relationship to two combustion chambers and following the steaming stage with a heating up and reduction stage wherein a draft current of combustible gas admixed with air is at first passed through one of said chambers, thence to and through said mass and finally through the second chamber and then the supply of air is cut off while still continuing the flow of combustible gas, such combustible gas as passes through said pervious mass into the second chamber being burnt therein by a further supply of air.

6. In the manufacture of hydrogen, the process which comprises maintaining a pervious body of ferruginous reaction material in heat receiving relationship to a combustion chamber and in alternately passing draft currents of water gas and of steam through such mass, a little air being admixed with the draft current of water gas in the reducing stage and the water gas coming from the pervious mass being completely burnt in the combustion chamber.

7. In the manufacture of hydrogen, the process which comprises maintaining a pervious body of ferruginous reaction material in heat receiving relationship to a combustion chamber and in alternately passing draft currents of reducing gas and of steam through such mass, a little air being admixed with the flow of reducing gas at first in the reduction stage and this air supply being subsequently cut off while continuing the flow of reducing gas, and the reducing gas emerging from the pervious mass being burnt in the combustion chamber.

8. In the manufacture of hydrogen, the process which comprises maintaining a pervious body of ferruginous reaction material in heat receiving relationship to a combustion chamber and in alternately passing draft currents of water gas and of steam through such mass, a little air being admixed with the flow of water gas at first in the reduction stage and this air supply being subsequently cut off while continuing the flow of water gas, and the water gas emerging from the pervious mass being burnt in the combustion chamber.

In testimony whereof, I affix my signature in the presence of two subscribing witnesses.

ANTON MESSERSCHMITT.

Witnesses:
MARTHA MESSERSCHMITT,
CARLE AUDOCASY.